(12) United States Patent
Hasegawa

(10) Patent No.: US 9,231,884 B2
(45) Date of Patent: Jan. 5, 2016

(54) TRAFFIC CONTROL DEVICE, TRAFFIC CONTROL METHOD, AND COMMUNICATION SYSTEM

(71) Applicant: FUJITSU LIMITED, Kawasaki-shi, Kanagawa (JP)

(72) Inventor: Hajime Hasegawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/283,270

(22) Filed: May 21, 2014

(65) Prior Publication Data

US 2014/0254485 A1  Sep. 11, 2014

Related U.S. Application Data

(63) Continuation of application No. PCT/JP2011/006530, filed on Nov. 24, 2011.

(51) Int. Cl.
*H04L 12/28* (2006.01)
*H04L 12/863* (2013.01)
(52) U.S. Cl.
CPC .................................. *H04L 47/6215* (2013.01)
(58) Field of Classification Search
CPC .................................................. H04L 47/6215
See application file for complete search history.

(56) References Cited

U.S. PATENT DOCUMENTS

| 2002/0012348 | A1* | 1/2002 | Mizuhara et al. | 370/392 |
|---|---|---|---|---|
| 2002/0054603 | A1* | 5/2002 | Musoll et al. | 370/412 |
| 2003/0135667 | A1* | 7/2003 | Mann et al. | 710/5 |
| 2003/0189935 | A1* | 10/2003 | Warden et al. | 370/395.21 |
| 2004/0196855 | A1* | 10/2004 | Davies et al. | 370/395.42 |
| 2006/0176808 | A1* | 8/2006 | Isobe et al. | 370/229 |
| 2009/0016267 | A1* | 1/2009 | Otsubo et al. | 370/328 |
| 2012/0008499 | A1* | 1/2012 | Stanwood et al. | 370/235 |

FOREIGN PATENT DOCUMENTS

| JP | 2000-92106 | 3/2000 |
|---|---|---|
| JP | 2004-364150 | 12/2004 |
| JP | 2006-222592 | 8/2006 |
| JP | 2007-36805 | 2/2007 |
| JP | 2007-184988 | 7/2007 |
| JP | 2009-21916 | 1/2009 |
| JP | 2010-219655 | 9/2010 |
| WO | 02/30065 A1 | 4/2002 |

OTHER PUBLICATIONS

Extended European Search Report mailed Mar. 17, 2015 in related European Application No. 11876183.2.
International Search Report mailed Dec. 27, 2011 in corresponding International Patent Application No. PCT/JP2011/006530.
Japanese Office Action mailed Apr. 28, 2015 in related Japanese Application No. 2013-545649.

* cited by examiner

*Primary Examiner* — Clemence Han
(74) *Attorney, Agent, or Firm* — Staas & Halsey LLP

(57) ABSTRACT

A traffic control device that controls traffic of data transmitted from mobile units that belong to different groups, includes a memory, and a processor coupled to the memory, configured to switch an output destination for the data in accordance with a group and a type of the data, store the data to a plurality of data storage sections on a first-in-first-out basis, adjust an output timing for the stored data in accordance with the group and the type of the data, and attach an identifier to the data output from the plurality of data storage sections in accordance with the group and the type of the data.

6 Claims, 10 Drawing Sheets

| NO | GROUP IDENTIFIER | DATA IDENTIFIER | ACCUMULATION TIME [ms] | DATA TYPE |
|---|---|---|---|---|
| 1 | 0 | 0 | 0 | Ping TEST PACKET |
| 2 | 1 | 1 | 100 | NORMAL VOICE FOR GENERAL MOBILE COMMUNICATION |
| 3 | 1 | 2 | 200 | PACKET FOR GENERAL MOBILE COMMUNICATION |
| 4 | 1 | 3 | 50 | URGENT VOICE FOR GENERAL MOBILE COMMUNICATION |
| 5 | 2 | 1 | 60 | NORMAL VOICE FOR FIRE DEPARTMENT COMMUNICATION |
| 6 | 2 | 2 | 80 | NORMAL PACKET FOR FIRE DEPARTMENT COMMUNICATION |
| 7 | 2 | 3 | 10 | URGENT VOICE FOR FIRE DEPARTMENT COMMUNICATION |
| 8 | 3 | 2 | 30 | PACKET FOR DISASTER-PREVENTION SENSOR COMMUNICATION |
| ... | | | | |
| 255 | – | – | – | – |

FIG. 6B

| NO | IDENTIFIER TYPE | RANGE | DATA TYPE |
|---|---|---|---|
| 1 | GROUP IDENTIFIER | 0-255 | 0:UNINTEGRATED 1-255:INTEGRATED |
| 2 | DATA IDENTIFIER | 0-255 | 0:UNINTEGRATED 1-255:INTEGRATED |

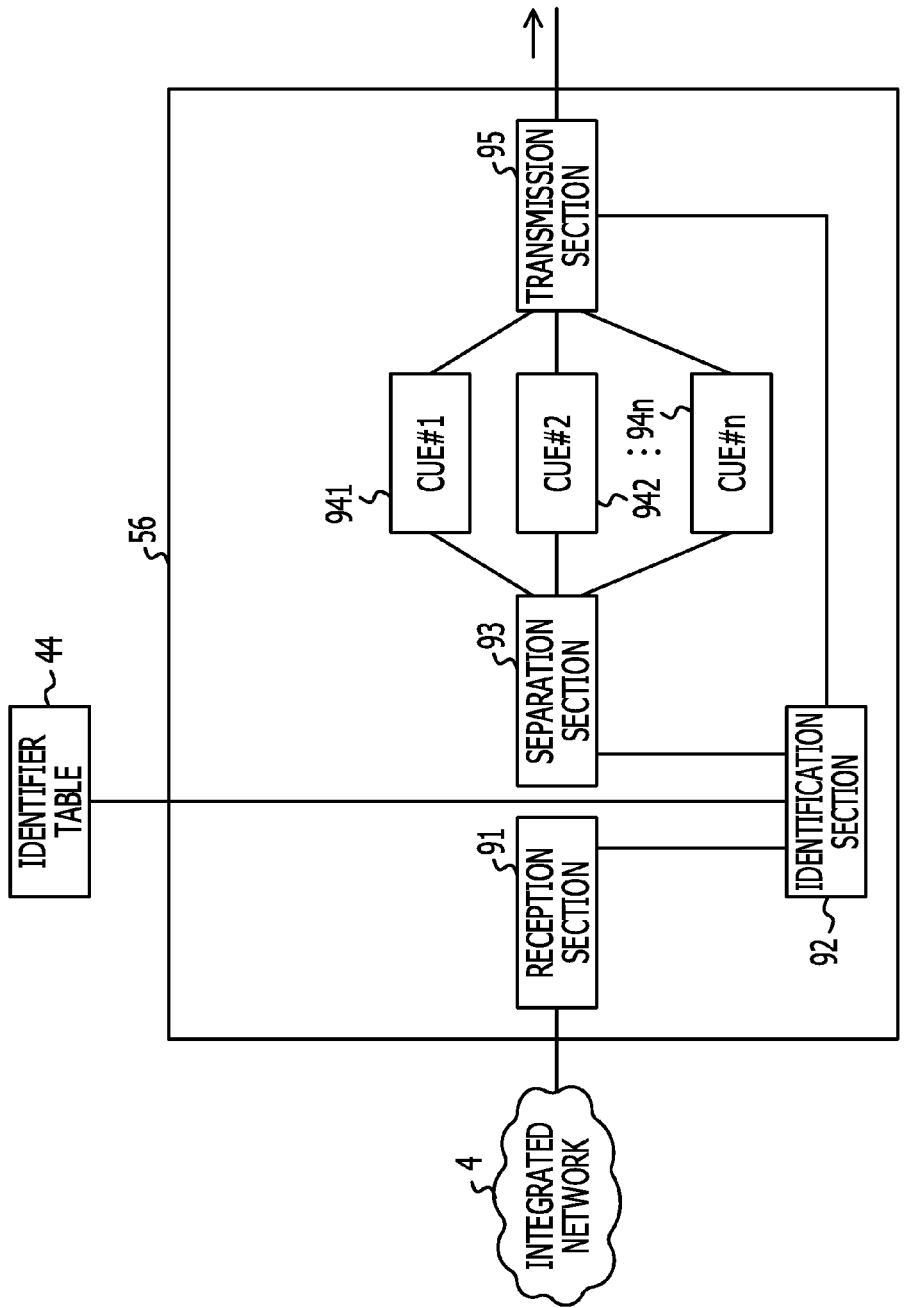

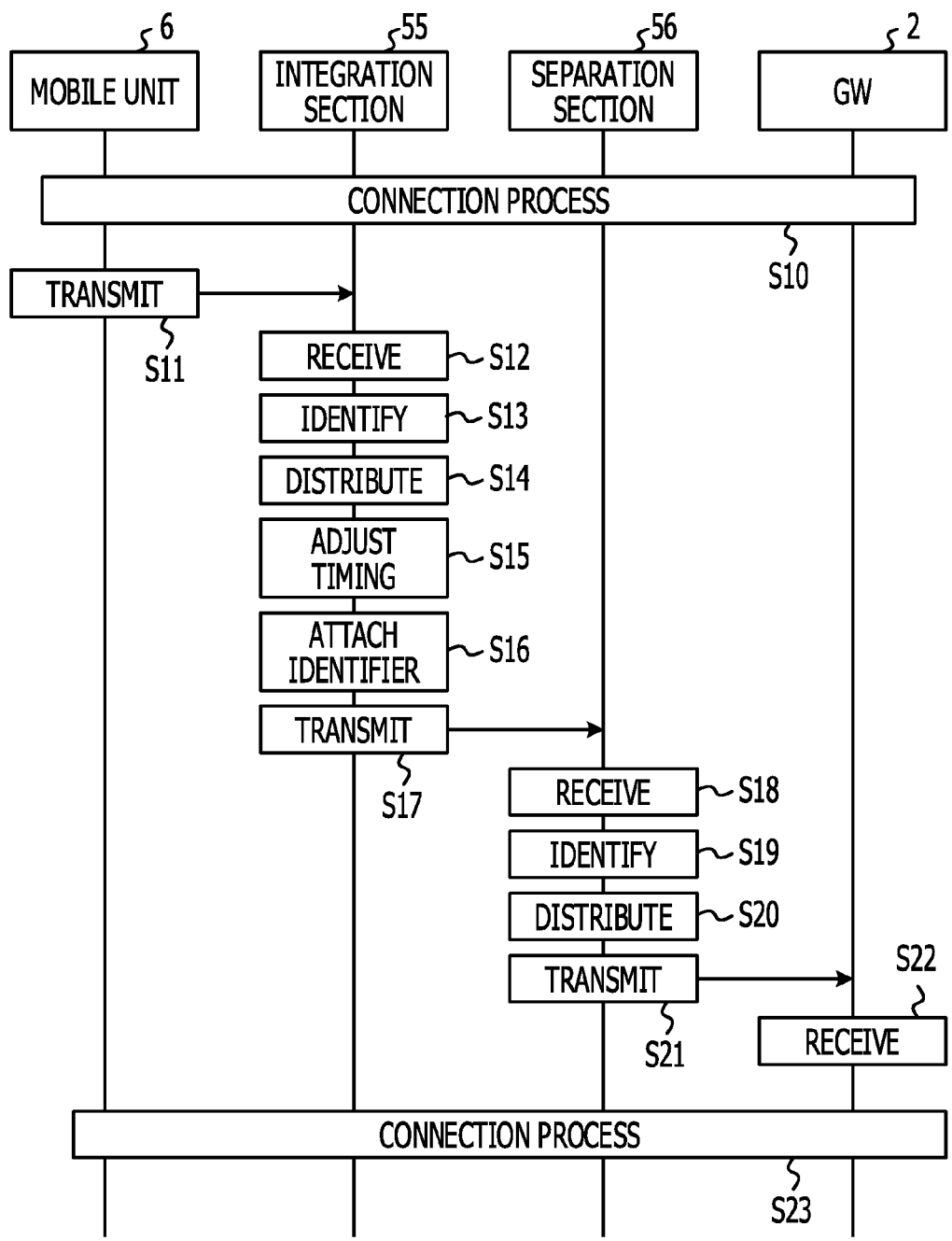

TRAFFIC CONTROL DEVICE, TRAFFIC CONTROL METHOD, AND COMMUNICATION SYSTEM

CROSS-REFERENCE TO RELATED APPLICATION

This application is a continuation application of International Application PCT/JP2011/006530, filed on Nov. 24, 2011, the entire contents of which are incorporated herein by reference.

FIELD

The embodiment discussed herein is related to a traffic control device that controls traffic of data signals, a traffic control method, and a communication system.

BACKGROUND

In communication networks such as stationary communication networks and mobile communication networks, the number of network configurations is proportional to the number of communication carriers. Communication carriers such as public service businesses and public business system operating organizations possess a communication network for providing their services and applications.

The communication carriers provide services on the communication network, and the services are roughly divided into real-time data communication such as voice communication and non-real-time communication such as data packet communication. These services are not necessarily provided through individual networks.

Although the communication carriers provide a diversity of services and applications, there is not a significant difference among the communication carriers as to how to use the communication network system. Therefore, the network is occasionally commonly used at the application level to provide certain services, of the same kind, for example, by mobile virtual network operators (MVNOs), for example. Technologies for common use of a network through packet control are known in the art. Such technologies are disclosed, for example, in Japanese Laid-open Patent Publication No. 2007-184988, Japanese Laid-open Patent Publication No. 2010-219655, Japanese Laid-open Patent Publication No. 2004-364150, and Japanese Laid-open Patent Publication No. 2006-222592.

SUMMARY

According to an aspect of the invention, a traffic control device that controls traffic of data transmitted from mobile units that belong to different groups, includes a memory, and a processor coupled to the memory, configured to switch an output destination for the data in accordance with a group and a type of the data, store the data to a plurality of data storage sections on a first-in-first-out basis, adjust an output timing for the stored data in accordance with the group and the type of the data, and attach an identifier to the data output from the plurality of data storage sections in accordance with the group and the type of the data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6A illustrates an identifier table;
FIG. 6B illustrates a table that defines various identifiers in the identifier table;
FIG. 9 is a functional block diagram of a separation section;
and
FIG. 10 is a sequence diagram illustrating a process performed by the wireless communication system.

DESCRIPTION OF EMBODIMENT

In the case where a network is to be commonly used by a plurality of communication carriers (groups), the type of the service and the scale of business of each communication carrier are to be considered. For example, if a public service with high urgency but with low use frequency uses a large amount of traffic, assigning a certain region of a resource to the public service at all times may reduce the quality of other network services that commonly use the same network. If a service with high urgency is processed in the same manner as other services, on the other hand, a network connection may not be secured for the service with high urgency when the total amount of traffic is large.

An embodiment will be described below. Combinations of components of the embodiment are also included in embodiments of the present disclosure.

Figure 1:
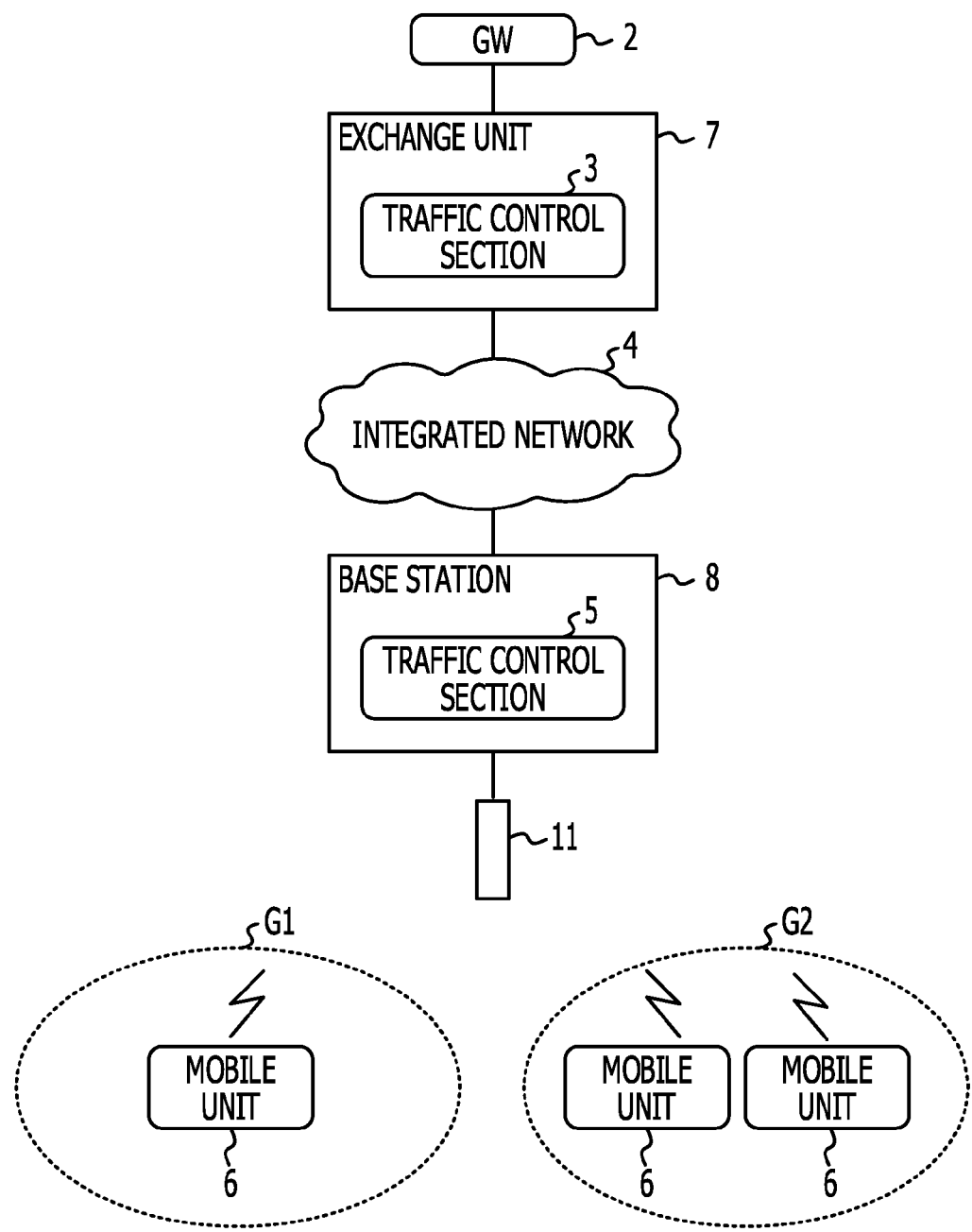
FIG. 1 is a block diagram of a wireless communication system.

FIG. 1 is a block diagram of a wireless communication system 1. As illustrated in FIG. 1, the wireless communication system 1 includes a gateway (GW) 2, an exchange unit 7, an integrated network 4, a base station 8, and mobile units 6. Groups G1 and G2 are different network groups. Each mobile unit 6 belongs to one of the network groups G1 and G2. In the embodiment, the groups G1 and G2 provide different services.

The GW 2 connects the wireless communication system 1 to other networks through protocol conversion or the like. The exchange unit 7 converts a packet signal into a signal form for propagation through the Internet, a voice call network, or the like. In the embodiment, the exchange unit 7 includes a traffic control section 3. The exchange unit 7 includes a central processing unit (CPU, not illustrated), a memory (not illustrated). Programs stored in the memory causes the CPU to perform the function of the traffic control section 3. The exchange unit 7 will be discussed in detail later.

The integrated network 4 is an Internet Protocol (IP) network for propagation of a network signal aggregated by the traffic control section 3, 5.

The base station 8 performs a relay process between a wireless network for communication with the mobile units 6 and the integrated network 4 which is wired. The base station 8 is an eNodeB in a Long Term Evolution (LTE) system, for example. In the embodiment, the base station 8 includes a traffic control section 5. The base station 8 will be discussed in detail later.

The traffic control section 3, 5 transmits an integrated data signal, which is obtained by aggregating data signals from a plurality of different groups, to the integrated network 4, and separates the integrated data signal received by way of the integrated network 4 into the data signals before being integrated. The traffic control section 3, 5 may be implemented as a part of the exchange unit 7 or the base station 8 as in the embodiment, or may be provided at an entry/exit port for the integrated network 4 as an independent traffic control device. Providing an independent traffic control device allows a plurality of base stations to be connected to the integrated network 4 through a single traffic control device.

The mobile units 6 are each a wireless station that performs wireless communication with the base station 8 while moving. Examples of the mobile units 6 include user equipment (UE) in the LTE system and sensors.

Thus, the wireless communication system 1 integrates data signals from a plurality of different groups to allow common use of the single integrated network 4.

Figure 2:
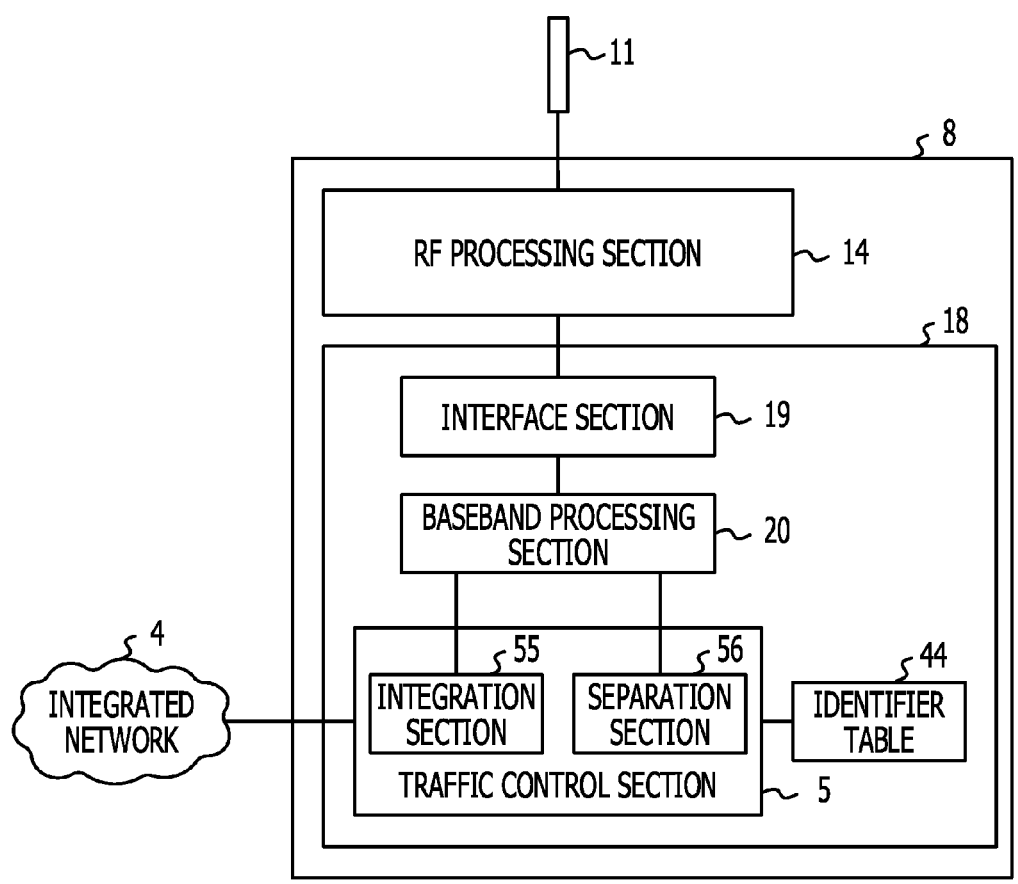
FIG. 2 is a functional block diagram of a base station.

FIG. 2 is a functional block diagram of the base station 8 in which the traffic control section 5 is implemented. In the embodiment, the traffic control section 5 is implemented in the base station 8. However, the traffic control section 5 may be installed to relay the base station 8 and the integrated network 4 as a single independent traffic control device. The base station 8 includes an antenna 11, a radio frequency (RF) processing section 14, and a communication processing section 18.

The antenna 11 converts a received radio wave into an RF signal, and converts an RF signal into a radio wave to be transmitted. The RF processing section 14 converts a baseband signal and an RF signal to each other, and amplifies the signals. The communication processing section 18 performs a modulation/demodulation process, an error correction process, and so forth on the signals. The communication processing section 18 includes an interface section 19, a baseband processing section 20, the traffic control section 5, and an identifier table 44.

The interface section 19 performs a process for conversion between an analog signal and a digital signal, a modulation/demodulation process, and so forth on the signals. The baseband processing section 20 performs processes such as attaching information to a signal to be transmitted and separating information from a received signal.

The traffic control section 5 includes an integration section 55 and a separation section 56. The integration section 55 integrates data signals received from a plurality of groups. The separation section 56 separates an integrated data signal into different groups. In addition, the traffic control section 5 is connected to the integrated network 4 through a transfer path such as an Ethernet (registered trademark) to process a protocol to exchange an IP packet. The integration section 55 and the separation section 56 will be discussed in detail later.

The identifier table 44 is a table for management of an identifier to be attached to the integrated data signal to be transmitted to the integrated network 4. The traffic control section 5 references the identifier table 44 when the data signals are to be integrated and separated. The identifier table 44 will be discussed in detail later.

Thus, the base station 8 aggregates data signals transmitted from mobile units that belong to different groups, and separates and transmits an aggregated data signal received from a higher-level device to mobile units that belong to different groups.

Figure 3:
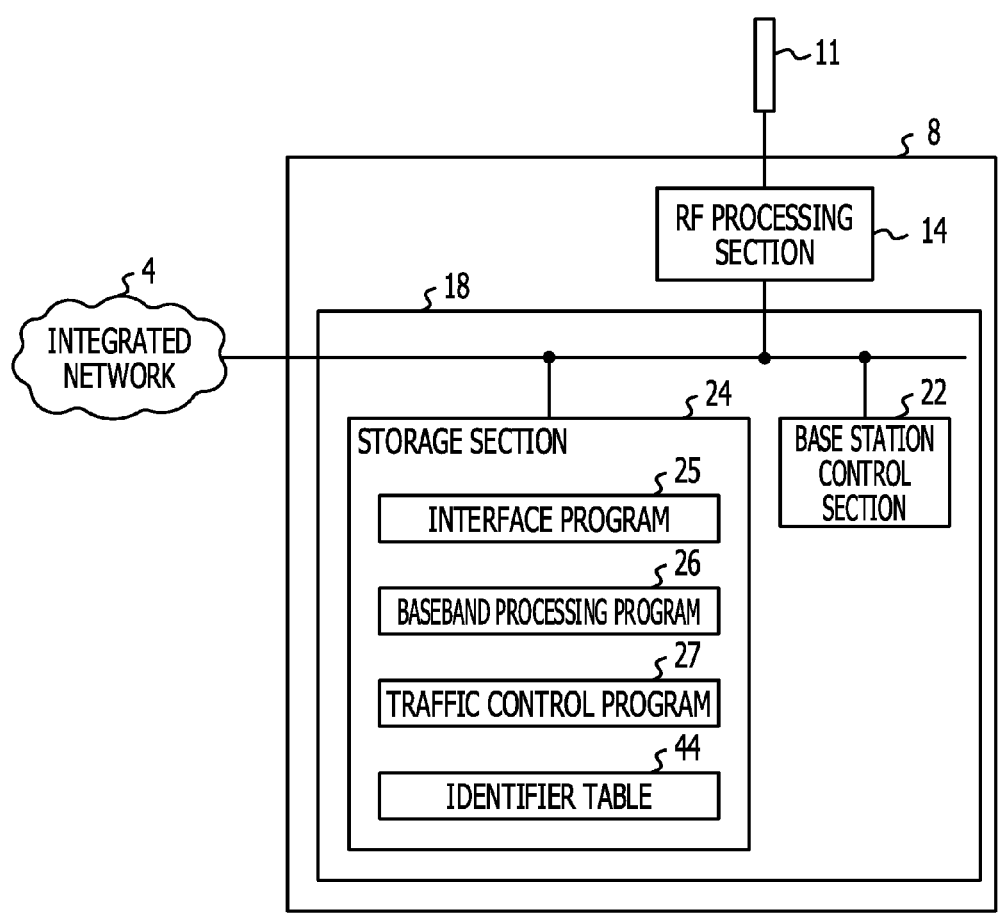
FIG. 3 is a hardware block diagram of the base station.

FIG. 3 is a hardware block diagram of the base station 8 according to the embodiment. Members in FIG. 3 that are the same as those in FIG. 2 are denoted by the same reference numerals to omit overlapping description.

The communication processing section 18 includes a base station control section 22 and a storage section 24. The base station control section 22 controls operation of the base station 8. The storage section 24 stores programs and data for operation to control the base station control section 22. The base station control section 22 and the storage section 24 are connected to each other through a bus. The base station control section 22 is formed from at least one processor dedicated to a specific process or general-purpose processor.

The storage section 24 stores an interface program 25, a baseband processing program 26, a traffic control program 27, and the identifier table 44.

The base station control section 22 executes the interface program 25 to function as the interface section 19. The base station control section 22 executes the baseband processing program 26 to function as the baseband processing section 20. The base station control section 22 executes the traffic control program 27 to function as the traffic control section 5. The traffic control section 5 references the identifier table 44 when packet data are integrated and separated.

Thus, the base station 8 executes the traffic control program 27 stored in the storage section 24 to provide the function of the traffic control section 5. In the embodiment, the traffic control section 5 is implemented by executing a program. However, the traffic control section 5 may be implemented by an electronic circuit such as an application specific integrated circuit (ASIC).

Figure 4:
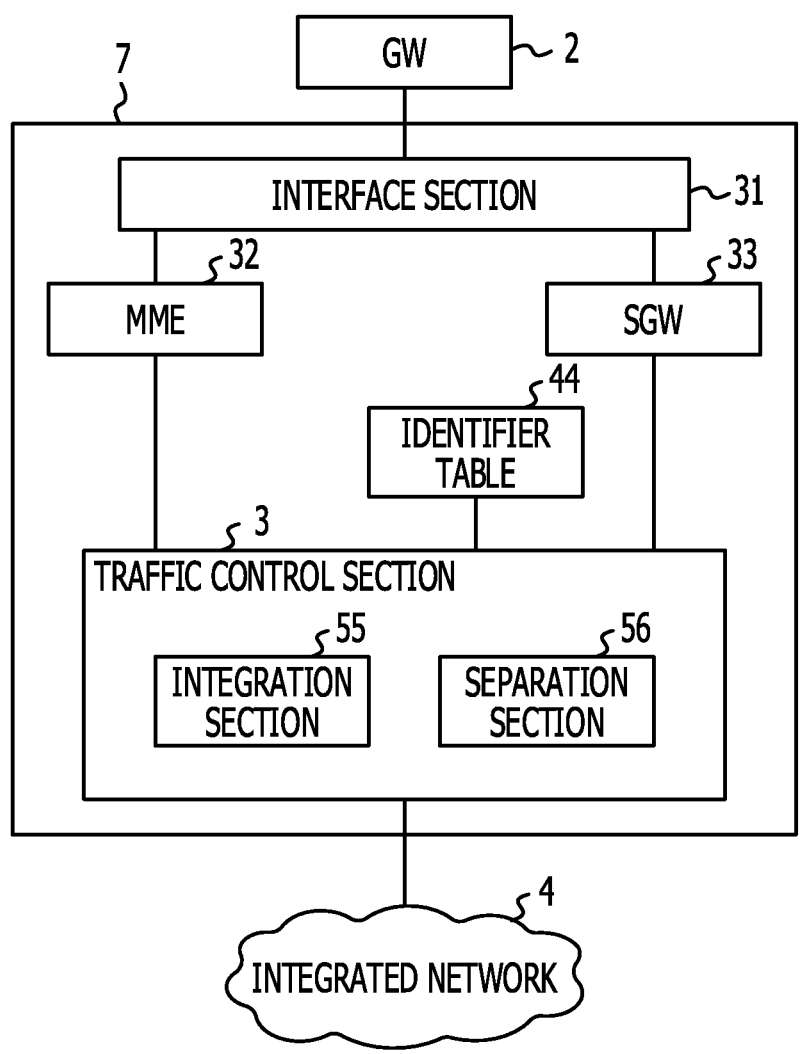
FIG. 4 is a functional block diagram of an exchange unit.

FIG. 4 is a functional block diagram of the exchange unit 7. In the embodiment, the exchange unit 7 is a packet exchange unit for the LTE system. The exchange unit 7 includes an interface section 31, a mobility management entity (MME) 32 for the LTE system, a serving gateway (SGW) 33, and the traffic control section 3.

The interface section 31 performs a process for conversion between a communication protocol for the GW 2 and a communication protocol for the integrated network 4. The MME 32 is a main control node of an LTE network. The MME 32 tracks the mobile units 6 in an idle mode, and performs a paging process including retransmission. The SGW 33 routes and transfers a data signal.

The traffic control section 3 includes an integration section 55 and a separation section 56 as with the traffic control section 5. The integration section 55 integrates network signals for different services received from the GW 2. The separation section 56 separates an aggregated network signal received from the integrated network 4 into network signals for a plurality of different services. The integration section 55 and the separation section 56 will be discussed in detail later.

Thus, the exchange unit 7 integrates data signals transmitted from the GW 2 which belong to different groups, and separates and transmits an integrated data signal received from the integrated network 4 to the GW 2 which belong to different groups.

Figure 5:
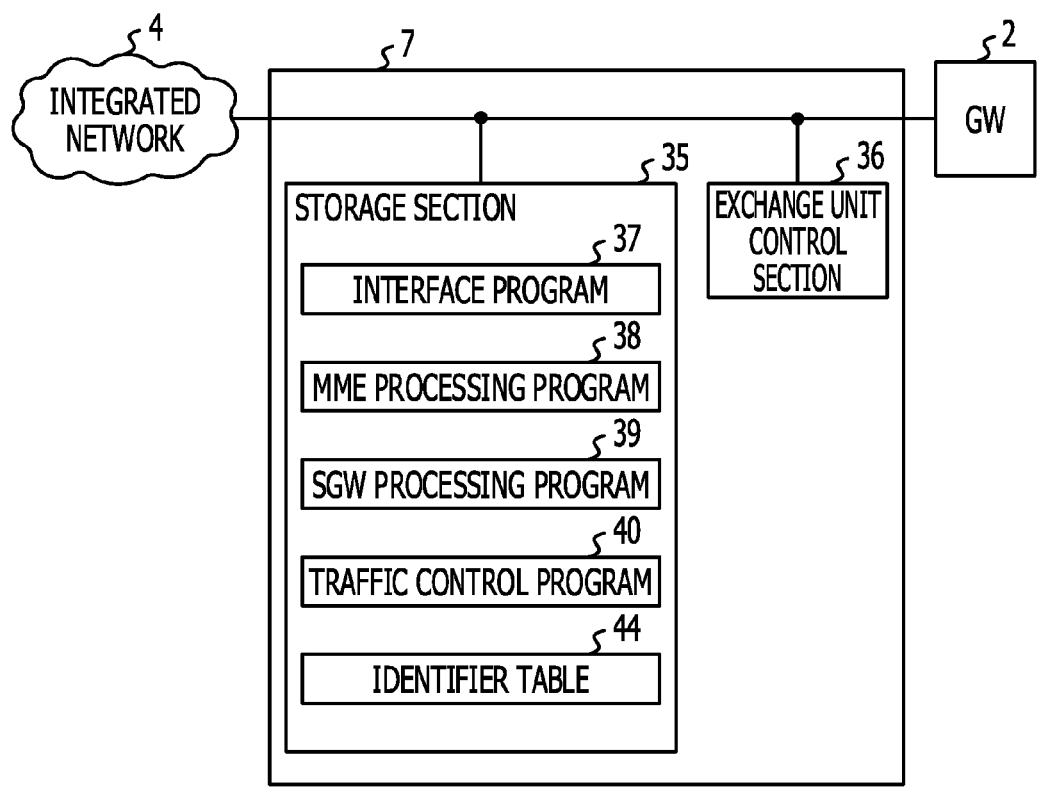
FIG. 5 is a hardware block diagram of the exchange unit.

FIG. 5 is a hardware block diagram of the exchange unit 7. Members in FIG. 5 that are the same as those in FIG. 4 are denoted by the same reference numerals to omit overlapping description.

The exchange unit 7 includes an exchange unit control section 36 and a storage section 35. The storage section 35 includes an interface program 37, an MME processing program 38, an SGW processing program 39, a traffic control program 40, and the identifier table 44. In the embodiment, the identifier table 44 stored in the storage section 35 is identical to the identifier table 44 stored in the storage section 24. The exchange unit control section 36 is formed from at least one processor dedicated to a specific process or general-purpose processor.

The exchange unit control section 36 controls operation of the exchange unit 7. The exchange unit control section 36 executes the interface program 37 stored in the storage section 35 to function as the interface section 31. The exchange unit control section 36 executes the MME processing program 38 stored in the storage section 35 to function as the MME 32. The exchange unit control section 36 executes the SGW processing program 39 stored in the storage section 35 to function as the SGW 33. The exchange unit control section 36 executes the traffic control program 40 stored in the storage section 35 to function as the traffic control section 3.

Thus, the traffic control section 3 is implemented by the exchange unit control section 36 of the exchange unit 7 by executing the traffic control program 40. In the embodiment, the traffic control section 3 is implemented by executing a program. However, the traffic control section 3 may be implemented by an electronic circuit such as an ASIC.

The traffic control section 3, 5 may be provided at an entry/exit port for the integrated network 4. Hence, the traffic control section 3, 5 may be implemented in a node other than the base station 8 and the exchange unit 7, or may be provided at an entry/exit port for the integrated network 4 as an independent traffic control device.

FIGS. 6A and 6B illustrate the identifier table 44. FIG. 6A illustrates the identifier table 44. FIG. 6B illustrates a table that defines various identifiers in the identifier table 44. In the embodiment, the identifier table 44 is stored in the storage section 24 of the base station 8 and the storage section 35 of the exchange unit 7. The identifier table 44 may be stored in a data server that is accessible from the base station 8 and the exchange unit 7.

FIGS. 6A and 6B illustrate an example of the identifier table 44. In the embodiment, the identifier table 44 has fixed values. If data in the identifier table 44 have variable values, the traffic control section 3, 5 is able to flexibly change the values in the identifier table 44 in accordance with the status of execution of a service or an application to be executed through the integrated network 4.

In the identifier table 44, a row 61n indicates identifiers to be attached to various packets for each network service and the accumulation time for a cue. In the embodiment, n is an integer of 1 to 255.

In the identifier table 44, a column 62 indicates the value of a group identifier assigned to each network service. A column 63 indicates the value of a data identifier assigned to various packets. A column 64 indicates the accumulation time for which various packets are accumulated for a cue to be discussed later. A column 65 indicates the data type such as a network service type or a packet type corresponding to the group identifier and the data identifier.

The group identifier indicated in the column 62 may be determined by referencing table data indicating the group to which a mobile unit or the like which transmitted the data belongs. The table data may be stored in a data server that is accessible from the base station 8 and the exchange unit 7, or may be stored in the base station 8 and the exchange unit 7 which implement the integration section 55. In addition, the data identifier indicated in the column 63 may be determined by referencing the header of each data signal.

The rows 611 to 61255 indicate the group identifier, the data identifier, and the accumulation time assigned to each data type. For example, in the row 611, the group identifier in the column 62 is "0", the data identifier in the column 63 is "0", and the accumulation time in the column 64 is 0 ms. That is, the row 611 indicates that the cue accumulation time for a packet signal for a Ping test packet is 0 ms, and that an identifier "00" is attached when the Ping test packet is output to the integrated network 4. In the embodiment, the Ping test packet to which an identifier "00" is attached is processed as an unintegrated service packet.

In the row 612, meanwhile, the group identifier in the column 62 is "1", the data identifier in the column 63 is "1", and the accumulation time in the column 64 is 100 ms. That is, the row 612 indicates that the cue accumulation time for a packet signal for a voice packet for general mobile communication is 100 ms, and that an identifier "11" is attached when the voice packet for general mobile communication is output to the integrated network 4.

In the embodiment, each data type has two identifiers. In the column 62, a group identifier "1" is assigned to groups for general mobile communication, a group identifier "2" is assigned to groups for fire department communication, and a group identifier "3" is assigned to groups for disaster-prevention sensor communication. In the column 63, meanwhile, the data identifier for normal voice is "1", the data identifier for packets is "2", and the data identifier for urgent voice is "3".

Thus, it is possible to easily manage the order of priority among groups, which may be subject to change because of an increase and a decrease in number of groups, by separately managing the order of priority among groups and the order of priority within each group.

FIG. 6B illustrates a table illustrating the group identifier in the column 62 and the data identifier in the column 63 in the table of FIG. 6A. In the table of FIG. 6B, a row 66 indicates the details of the group identifier. A row 67 indicates information on the data identifier.

In the table of FIG. 6B, a column 68 indicates the type of the identifier. A column 69 indicates the range of numerical values that may be set to each identifier. A column 70 indicates information as to whether or not a packet signal corresponding to each value of the identifier is to be integrated. That is, the row 66 indicates that the group identifier may be set in the range of "0" to "255", among which the value "0" corresponds to a packet not to be integrated and the values from "1" to "255" correspond to group identifiers for packets to be integrated. Meanwhile, the row 67 indicates that the data identifier may be set in the range of "0" to "255", among which the value "0" corresponds to a packet not to be integrated and the values from "1" to "255" correspond to data identifiers for packets to be integrated.

Thus, the traffic control section 3, 5 references the identifier table 44 to specify the group, the data form, and the cue accumulation time corresponding to each data signal.

Figure 7:
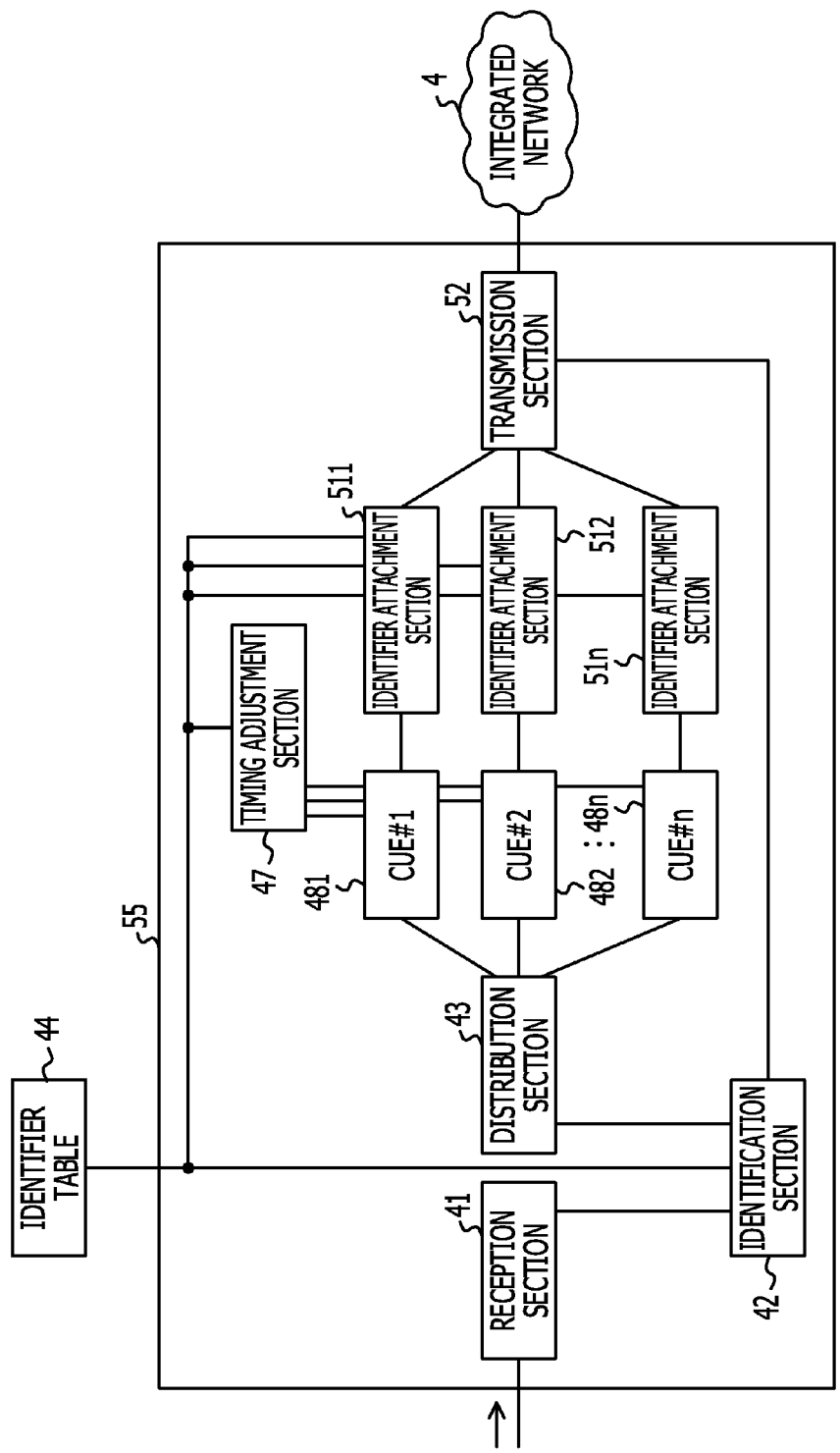
FIG. 7 is a functional block diagram of an integration section.

FIG. 7 is a functional block diagram of the integration section 55 in the traffic control section 3, 5. The integration section 55 integrates a plurality of data signals received from each group based on the identifier table 44, and outputs the integrated signal to the integrated network 4. In the embodiment, the integration section 55 of FIG. 7 is described as operating in the base station 8.

The integration section 55 includes a reception section 41, an identification section 42, a distribution section 43, cues 48n, a timing adjustment section 47, identifier attachment sections 51n, and a transmission section 52. In the embodiment, n is an integer of 1 to 255. The respective functions of the integration section 55 are implemented by the base station control section 22 of the base station 8 by executing the traffic control program 27.

The reception section 41 receives a data signal transmitted from a plurality of mobile units 6 that belong to a plurality of different groups. The reception section 41 outputs the received data signal in units of packets.

The identification section 42 specifies the group to which the node which transmitted the data signal and the data type based on the header information of the data signal output from the reception section 41. The identification section 42 provides the distribution section 43 with an instruction on the distribution destination for the specified data signal based on the identifier table 44. In addition, the identification section 42 outputs data not registered in the identifier table 44 to the transmission section 52.

The distribution section 43 outputs the data signal input from the identification section 42 to one of the cues 48$n$ designated by the identification section 42. The cues 48$n$ are each a data storage section that holds data with a list structure on the first-in-first-out (FIFO) basis. In the embodiment, n is an integer of 1 to 255. The value of n corresponds to the row number in the identifier table 44. The cues 48$n$ may each be a memory region secured in the storage section which stores the traffic control program 27. The cue 48$n$ transmits a temporarily stored data signal to the identifier attachment section 51$n$ in accordance with a transmission permission signal output from the timing adjustment section 47.

The timing at which packet data are output from the cue 48$n$ may also be controlled in accordance with the size of the memory region of the cue 48$n$. It is possible to vary the time since packet data are input to the cue 48$n$ until the packet data are output by varying the storage capacity of the cue 48$n$ which stores the packet data in accordance with the group or the type of data.

The timing adjustment section 47 outputs an output permission signal to the corresponding cue 48$n$ in accordance with the accumulation time set in the identifier table 44.

The identifier attachment section 51$n$ attaches header information including an identifier determined based on the identifier table 44 to the data signal input from the cue 48$n$. The identifier attachment section 51$n$ outputs an integrated data signal to which the header information has been attached to the transmission section 52. The integrated data signal to be transmitted to the integrated network 4 will be discussed in detail later.

The transmission section 52 transmits the integrated data signal input from the identifier attachment section 51$n$ to the integrated network 4. In addition, the transmission section 52 transmits the data signal input from the identification section 42 to the integrated network 4.

Thus, the traffic control section 3, 5 including the integration section 55 integrates data signals received from a plurality of different groups based on the degree of priority and the degree of importance of data, and transmits an integrated data signal to the integrated network 4.

Figure 8:
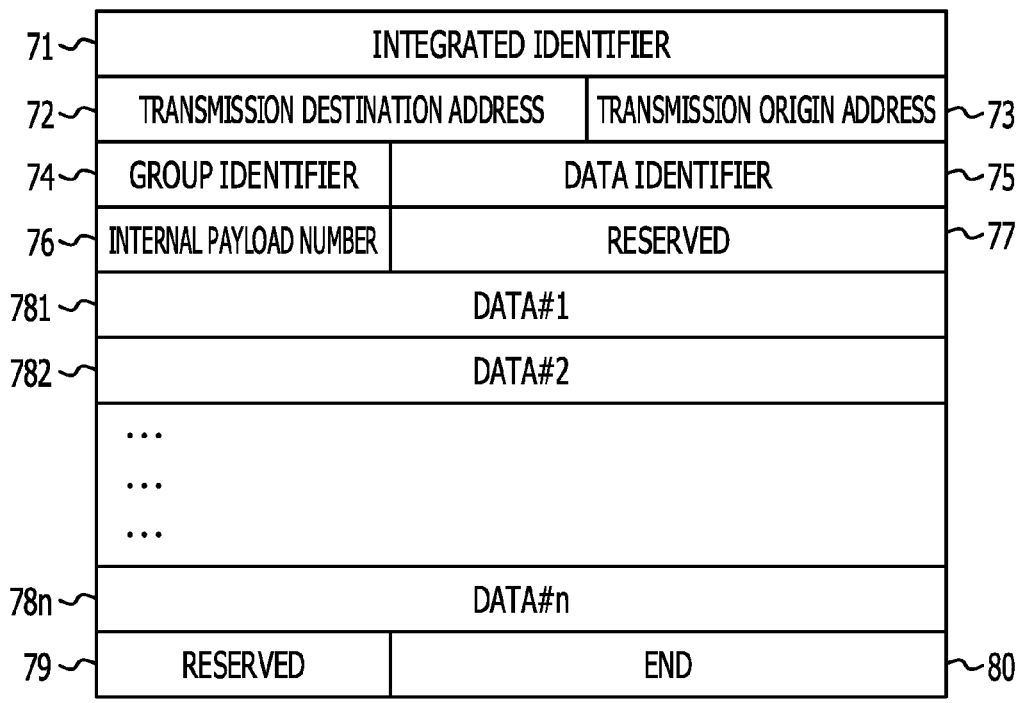
FIG. 8 is a table illustrating an integrated data signal.

FIG. 8 is a table illustrating the integrated data signal output from the identifier attachment section 51$n$. The integrated data signal includes an integration identifier 71, a transmission destination address 72, a transmission origin address 73, a group identifier 74, a data identifier 75, an internal payload number 76, Reserveds 77 and 79, data 78$n$, and an End 80.

The integration identifier 71 is an identifier for identification of the integrated data signal after a plurality of packet data are integrated. In the case where there are a plurality of traffic control sections that output an integrated data signal to the integrated network 4, the same integration identifier 71 may be attached to all the integrated data signals. If the same integration identifier 71 is used, integrated data signals received from different nodes by way of the integrated network 4 may even be identified without failure.

The transmission destination address 72 is the network address of a node in which a traffic control section serving as the transmission destination for the integrated data signal is implemented. Attaching the transmission destination address 72 allows the transmission destination to be specified in the case where there are a plurality of traffic control sections serving as the transmission destination.

The transmission origin address 73 is the network address of a node in which a traffic control section serving as the transmission origin of the integrated data signal is implemented. Attaching the transmission origin address 73 allows the node which receives the integrated data signal to specify the transmission origin in the case where there are a plurality of traffic control sections serving as the transmission origin.

The transmission destination address 72 and the transmission origin address 73 are determined based on information on a negotiation packet. Before starting communication, the transmission origin node and the transmission destination node execute a negotiation to establish a line. After the negotiation is completed, the identifier attachment section 51$n$ references the negotiation packet to grasp the transmission destination address 72 and the transmission origin address 73.

The values of the group identifier 74 and the data identifier 75 are determined by referencing the identifier table 44. The group identifier 74 and the data identifier 75 correspond to the column 62 and the column 63, respectively, of the identifier table 44.

The Reserveds 77 and 79 are regions preliminarily secured for future function expansion. In the case where the integrated data signal has a packet size of a fixed length, the region size of the Reserveds 77 and 79 corresponds to the vacant region left after the data signals are integrated.

The data 78$n$ are a plurality of data signals output from any of the cues 48$n$. m is the number of data signals accumulated in any one of the cues 48$n$. The plurality of data 78$n$ accumulated in one of the cues 48$n$ are collectively output to the identifier attachment section 51$n$ in response to an output permission signal output from the timing adjustment section 47. The End 80 is an end mark that indicates the end of the integrated packet signal.

Thus, the integration section 55 transmits an integrated data signal obtained by integrating a plurality of data 78$n$ to another node.

FIG. 9 is a functional block diagram of the separation section 56 in the traffic control section 3, 5. The separation section 56 separates the integrated data signal received by way of the integrated network 4 based on the identifier table 44, and transmits the separated signals to the corresponding groups. In the embodiment, the separation section 56 of FIG. 9 is described as operating in the exchange unit 7.

The separation section 56 includes a reception section 91, an identification section 92, a separation section 93, cues 94$n$, and a transmission section 95. In the embodiment, n is an integer of 1 to 255. The value of n corresponds to the row number in the identifier table 44. The respective functions are implemented by executing the traffic control program 27.

The reception section 91 receives a data signal received by way of the integrated network 4. The reception section 91 outputs the received data signal to the identification section 92 in units of packets.

The identification section 92 identifies the integrated data signal based on the header information of the data signal output from the reception section 91 and the identifier table 44. The identification section 92 provides the separation section 93 with an instruction on the distribution destination based on the identifier of the identified integrated data signal. The separation section 93 removes header information that is specific to the integrated data signal from the header information when transmitting the data to each cue 94n. In addition, the identification section 92 outputs a normal data signal other than the integrated data signal to the transmission section 95.

The cues 94n temporarily hold packet data distributed by the separation section 93 before such data are deployed to processing nodes such as an MME and an SGW as the transmission destination. In the embodiment, the cues 94n are each a data storage region that holds data with a list structure on the FIFO basis. By temporarily holding the data with the cues 94n, it is possible to avoid congestion of data processing at the processing nodes as the deployment destination in the case where such congestion is likely to occur. The cues 94n may not necessarily be provided, and packet data distributed by the separation section 93 may be directly deployed to the processing nodes. In order to avoid congestion of data processing, in addition, the cues 94n may have different storage capacities.

FIG. 10 is a sequence diagram illustrating a process performed by the wireless communication system 1. The sequence diagram of FIG. 10 illustrates a process in which a data signal transmitted from the mobile unit 6 is received by the GW 2 by way of the integration section 55 and the separation section 56.

Before transmitting data to the GW 2, the mobile unit 6 executes a negotiation (S10). After a connection process is completed by the negotiation, the mobile unit 6 transmits a data signal to the integration section 55 of the base station 8 (S11).

The integration section 55 receives the data signal transmitted from the mobile unit 6 (S12). The integration section 55 identifies the group to which the mobile unit 6 belongs and the data type based on the header information of the received data signal (S13). The integration section 55 distributes the data signal to any of the cues 48n based on the identification results and the identifier table 44 (S14). The data signal accumulated in the cue 48n is output at a timing adjusted based on the identifier table 44 (S15). The integration section 55 attaches header information including an identifier determined based on the identifier table 44 to the signal output from the cue 48n (S16). The integration section 55 transmits a plurality of data signals to which header information has been attached to the integrated network 4 as an integrated data signal (S17).

The integrated data signal is received by the exchange unit 7 by way of the integrated network 4. The separation section 56 of the exchange unit 7 receives the integrated data signal transmitted from the integration section 55 of the base station 8 (S18). The separation section 56 identifies the received integrated data signal based on the integration identifier 71 (S19). The separation section 56 distributes the identified integrated data signal to any of the cues 94n based on the identifier table 44 (S20). After a certain time elapses, the cue 94n transmits the accumulated data signal to the GW 2 (S21).

The GW 2 receives the data signal transmitted from the separation section 56 (S22). After receiving the data signal, the GW 2 executes a disconnection process in which connection with the mobile unit 6 is disconnected (S23). After the disconnection process is completed, the data communication process between the mobile unit 6 and the GW 2 is ended.

Thus, the mobile unit 6 performs data communication with the GW 2 by way of the integrated network 4.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A traffic control device that controls traffic of data transmitted from a plurality of mobile units each of which belongs to a plurality of communication carriers, comprising:
a memory that stores identification information associated with each of the communication carriers and priority information indicating priority of each of the communication carriers; and
a processor coupled to the memory, configured to
receive first data,
specify, among the plurality of communication carriers, a first communication carrier to which the first data belongs, based on header information of the first data,
select a first data storage section corresponding to the first communication carrier among a plurality of data storage sections on a first-in-first-out basis,
store the first data into the first data storage section,
by referring to the priority information stored in the memory, adjust an output timing for the first data from the first data storage section, the priority information specifying a holding time for which the first data storage section holds the first data, and when the holding time is elapsed after the first data is input into the first data storage section, the first data is output from the first data storage section, and
by referring to the identification information stored in the memory, attach a first identifier corresponding to the first communication carrier to the first data.

2. The traffic control device according to claim 1, wherein the identification information includes another identification information corresponding to the type of the data.

3. The traffic control device according to claim 1, wherein the plurality of data storage sections have different storage capacities corresponding to the communication carriers and the type of the data.

4. A traffic control method for controlling traffic of data transmitted from a plurality of mobile units each of which belongs to a plurality of communication carriers, comprising:
storing identification information associated with each of the communication carriers and priority information indicatinq priority of each of the communication carriers;
receiving first data,
specifying, among the plurality of communication carriers, a first communication carrier to which the first data belongs, based on header information of the first data,
selecting a first data storage section corresponding to the first communication carrier among a plurality of data storage sections on a first-in-first-out basis,
by referring to the stored priority information, adjusting, by a processor, an output timing for the stored first data from the first data storage section, the priority information specifying a holding time for which the first data storage section holds the first data, and when the holding time is elapsed after the first data is input into the first data storage section, the first data is output from the first data storaqe section; and by referring to the stored identification information, attaching a first identifier corresponding to the first communication carrier to the first data.

5. The control method according to claim 4,
wherein the identification information includes another identification information corresponding to the type of the data.

6. A communication system that controls traffic of data transmitted from a plurality of mobile units each of which belongs to a plurality of communication carriers, comprising:
an integration section that includes
a first memory that stores identification information associated with each of the communication carriers and priority information indicating priority of each of the communication carriers, and
a first processor coupled to the first memory, configured to
receive first data transmitted from mobile units that belong to different groups;
specifying, among the plurality of communication carriers, a first communication carrier to which the first data belongs, based on header information of the first data,
select a first data storage section corresponding to the first communication carrier among a plurality of data storage sections on a first-in-first-out basis,
store the first data into the first data storage section,
by referring to the priority information stored in the first memory, adjust an output timing for the first data from the first data storage section, the priority information specifying a holding time for which the first data storage section holds the first data, and when the holding time is elapsed after the first data is input into the first data storage section, the first data is output from the first data storage section,
by referring to the identification information stored in the first memory, attach a first identifier corresponding to the first communication carrier to the first data
integrate the first data attached to the first identifier, and
output the integrated data; and
a separation section includes
a second memory, and
a second processor coupled to the second memory, configured to
receive the integrated data,
identify the integrated data output from the integration section based on the first identifier,
remove the first identifier from the integrated data, and separate the integrated data.

\* \* \* \* \*